(12) United States Patent
Abelli et al.

(10) Patent No.: US 10,933,574 B2
(45) Date of Patent: Mar. 2, 2021

(54) BOTTLING APPARATUS IN ASEPTIC CONDITIONS FOR CONTAINERS MADE OF THERMOPLASTIC MATERIAL

(71) Applicant: GEA PROCOMAC S.P.A., Sala Baganza (IT)

(72) Inventors: Paolo Abelli, Parma (IT); Fabio Callegari, Salsomaggiore Terme (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 0 days.

(21) Appl. No.: 16/649,367

(22) PCT Filed: Dec. 19, 2018

(86) PCT No.: PCT/IB2018/060370
§ 371 (c)(1),
(2) Date: Mar. 20, 2020

(87) PCT Pub. No.: WO2019/145775
PCT Pub. Date: Aug. 1, 2019

(65) Prior Publication Data
US 2020/0346388 A1 Nov. 5, 2020

(30) Foreign Application Priority Data

Jan. 23, 2018 (EP) .................................... 18153027
Feb. 16, 2018 (IT) ........................ 102018000002781

(51) Int. Cl.
*B29C 49/42* (2006.01)
*B29C 49/12* (2006.01)
(Continued)

(52) U.S. Cl.
CPC .......... *B29C 49/4236* (2013.01); *B29C 49/12* (2013.01); *B29C 49/36* (2013.01);
(Continued)

(58) Field of Classification Search
CPC ........ B29C 49/4236; B29C 2049/1295; B29C 49/46; B29C 49/58; B29C 2049/4697;
(Continued)

(56) References Cited

U.S. PATENT DOCUMENTS 8,197,245 B2   6/2012   Dordoni
8,435,024 B2   5/2013   Dordoni
(Continued)

FOREIGN PATENT DOCUMENTS

DE            2548035 A1 *  5/1976  ............ B65B 39/001
DE     102012112946 A1 *  6/2014  ......... B29C 49/4252
(Continued)

*Primary Examiner* — Robert B Davis
(74) *Attorney, Agent, or Firm* — Pearne & Gordon LLP (57) ABSTRACT

A bottling apparatus (200) in aseptic conditions of containers (100) made of a thermoplastic material, comprising: a stretching rod (5) partially located in a contamination-controlled environment (3) isolated from an external environment (4); a linear motor (6) comprising a cylindrical stator (7) and a rotor (8) integrally connected to the stretching rod (5); a first support (107) and a second support (207) for the rotor (8), arranged at opposite ends of the cylindrical stator (7) and integrally connected thereto, in each of the supports (107, 207) at least one passage (707, 807; 107a, 207a) being obtained to allow a sanitising fluid to pass through a separation volume (30) defined between the cylindrical stator (7) and the rotor (8).

21 Claims, 10 Drawing Sheets (51) Int. Cl.
  *B29C 49/46* (2006.01)
  *B29C 49/36* (2006.01)
  *B29C 49/58* (2006.01)
  *B67C 3/22* (2006.01)
  *B67C 7/00* (2006.01)
  *B29L 31/00* (2006.01)

(52) U.S. Cl.
  CPC .......... *B29C 49/4273* (2013.01); *B29C 49/46* (2013.01); *B29C 49/58* (2013.01); *B67C 3/22* (2013.01); *B67C 7/00* (2013.01); *B29C 2049/1295* (2013.01); *B29C 2049/4697* (2013.01); *B29L 2031/7158* (2013.01); *B67C 2003/227* (2013.01)

(58) Field of Classification Search
  CPC ............ B29C 49/4273; B29C 49/4252; B29C 2049/4664; B29C 2049/4658
  See application file for complete search history.

(56) References Cited

U.S. PATENT DOCUMENTS

| | | | |
|---|---|---|---|
| 8,684,716 B2 * | 4/2014 | Voth | ...................... F16C 33/201 425/73 |
| 8,708,680 B2 * | 4/2014 | Geltinger | ................ B29C 49/46 425/3 |
| 8,944,807 B2 | 2/2015 | Schmidt | |
| 2010/0272844 A1 | 10/2010 | Dordoni | |
| 2011/0241265 A1 | 10/2011 | Schmidt | |
| 2012/0164258 A1 | 6/2012 | Dordoni | |

FOREIGN PATENT DOCUMENTS

| | | | |
|---|---|---|---|
| DE | 202015004083 | 7/2015 | |
| EP | 2186619 | 5/2010 | |
| EP | 2246176 | 11/2010 | |
| EP | 2279850 | 2/2011 | |
| EP | 2340157 | 7/2011 | |
| EP | 3357668 A1 * | 8/2018 | ............. B29C 49/46 |

* cited by examiner

BOTTLING APPARATUS IN ASEPTIC CONDITIONS FOR CONTAINERS MADE OF THERMOPLASTIC MATERIAL

The present invention relates to a bottling apparatus in aseptic conditions for containers made of thermoplastic material.

As is known, a bottling apparatus in aseptic conditions includes a unit for forming containers starting from parisons made of thermoplastic material. For example, the forming unit comprises a stretch-blowing carousel with a plurality of work stations, in each of which there is a forming mould. Aside from design variations, each mould comprises two half-moulds that reproduce the shape of the sides of the container and a bottom that reproduces the shape of the base of the container to be obtained.

The parison, previously heated, is introduced into the mould and the mouth is sealed by a closing member—the "seal" or blowing nozzle—through which compressed air is insufflated inside the parison itself.

In the initial step of the forming process, the seal sends air into the parison at medium pressure (maximum 15 bar) and, simultaneously, a stretching rod is gradually introduced into the parison until it reaches the bottom. After having touched the bottom, the stretching rod continues its linear stroke so as to stretch the parison until substantially reaching the desired length of the container to be obtained.

Subsequently, the seal insufflates air at high pressure (about 40 bar) so as to expand the parison until it adheres to the inside walls of the half-moulds and of the bottom. Simultaneously, the stretching rod retracts until it exits from the container.

At the end of forming, the containers pass to a filling unit and, subsequently, a closing and/or capping unit.

The reference sector for the present invention is the bottling of so-called "sensitive" food products, i.e. products that are particularly sensitive to bacteriological contamination and oxidation, such as, for example, isotonic drinks, juices, nectars, soft drinks, tea, milk-based drinks, coffee-based drinks, etc., for which the prevention of possible microbiological contamination throughout all packaging stages is of fundamental importance.

The Applicant has developed a method for bottling containers wherein the different treatment steps (e.g. forming, filling, closing) and transport of the parisons and/or containers are performed inside microbiological isolators that define contamination-controlled environments. All the means for actuating the mobile organs located inside the isolators are placed outside the isolators themselves (see European patent EP2279850).

The preliminary sterilisation step involves all the devices that come into contact with the containers or the parisons, with the evident structural complexity and waste of time.

For example, consider the stretching rod.

Since the blowing nozzle constitutes a passage channel for contaminants within the parison, the Applicant had to design a stretch-blowing device to be incorporated with the microbiological isolation device.

In such device, protected by European patent EP2340157, the stretching rod is delimited by a casing that defines a sealingly closed chamber with respect to the external environment (contaminated) and is movable from the outside.

In particular, the movement of the rod is obtained thanks to the coupling of two magnetic units: a first magnetic unit, external to the casing and activatable for example through a pneumatic cylinder or an electric motor, and a second magnetic unit, integrally connected to the stretching rod.

However, the solution just described is not free from problems, mainly connected with structural complexity, which makes maintenance operations laborious and long.

Furthermore, to prevent excessive bulk, the first magnetic unit is arranged parallel to the stretching rod. This requires careful management of the moments generated by the forces at stake, i.e. correct alignment of the various axes.

In this context, the technical task underpinning the present invention is to provide a bottling apparatus in aseptic conditions for containers made of thermoplastic material, that obviates the drawbacks of the prior art mentioned above.

In particular, it is an object of the present invention to provide a bottling apparatus in aseptic conditions for containers made of thermoplastic material, that allows the mobile organs situated in the isolated environment to be moved accurately and quickly.

Another object of the present invention is to propose a bottling apparatus in aseptic conditions for containers made of thermoplastic material, that is structurally simpler and more compact with respect to the prior-art solutions.

The defined technical task and the specified aims are substantially achieved by a bottling apparatus in aseptic conditions for containers made of thermoplastic material, comprising:

at least one mobile organ partially situated in a contamination-controlled environment isolated from an external environment;

an actuation device for actuating the mobile organ, characterised in that the actuation device comprises a linear motor, in turn comprising:

a cylindrical stator;

a rotor or magnetic shaft linearly sliding in the cylindrical stator and spaced thereto in such a way that between the cylindrical stator and the rotor a separation volume is obtained, the rotor being integrally connected to the mobile organ;

a first support and a second support for the rotor in which the rotor is slidably mounted, the first support and the second support being located at opposite ends of the cylindrical stator and integrally connected thereto, in each of the supports at least one passage being obtained to allow a sanitising fluid to flow through the separation volume.

In accordance with one embodiment, the passage obtained in each support consists in at least one groove obtained on a surface of the corresponding support.

Preferably, the first support and the second support have the shape of a hollow cylinder.

Preferably, the groove of each support is obtained on an inner side surface of the corresponding support.

Preferably, the groove of each support has a helicoidal or longitudinal development.

In accordance with another embodiment, the passage obtained in each support is a through channel that crosses the corresponding support.

Preferably, the first support and the second support have the shape of a hollow cylinder.

For example, each support is obtained by the assembly or the combination of an inner hollow cylinder and an outer hollow cylinder which is coaxial to the corresponding inner hollow cylinder, the rotor being slidably mounted within said inner hollow cylinders.

Preferably, the through channel of each support is obtained in the corresponding inner hollow cylinder.

In particular, the through channel of each support has a cylindrical development and is coaxial to the corresponding inner hollow cylinder.

Alternatively, the through channel of each support partially crosses the corresponding inner hollow cylinder and partially crosses the corresponding outer hollow cylinder.

Alternatively, the through channel obtained in the first support crosses only the corresponding inner hollow cylinder and the through channel obtained in the second support partially crosses the corresponding inner hollow cylinder and partially crosses the corresponding outer hollow cylinder.

Alternatively, the through channel obtained in the first support partially crosses the corresponding inner hollow cylinder and partially crosses the corresponding outer hollow cylinder and the through channel obtained in the second support crosses only the corresponding inner hollow cylinder.

In accordance with another embodiment, the passage obtained in the first support consists in at least one groove obtained on a surface of the first support and the passage obtained in the second support is a through channel that crosses the second support.

In accordance with another embodiment, a plurality of passages is obtained in each support.

The mobile organ can be chosen among:
a stretching rod;
a blowing nozzle;
a driving organ that drives the opening and closing of a forming mould of the bottling apparatus;
a driving organ that drives the rising and lowering of a bottom of the bottling apparatus;
a pushing element that expels the containers to be discarded;
a gripper that is operatively active on the neck of one of the containers.

Further characteristics and advantages of the present invention will more fully emerge from the non-limiting description of a preferred but not exclusive embodiment of a bottling apparatus in aseptic conditions for containers made of thermoplastic material, as illustrated in the accompanying drawings, in which.

With reference to the figures, the number 200 indicates a bottling apparatus in aseptic conditions for containers 100 made of thermoplastic material.

In this context, the term container 100 indicates both a formed container and a parison made of thermoplastic material.

Figure 1:
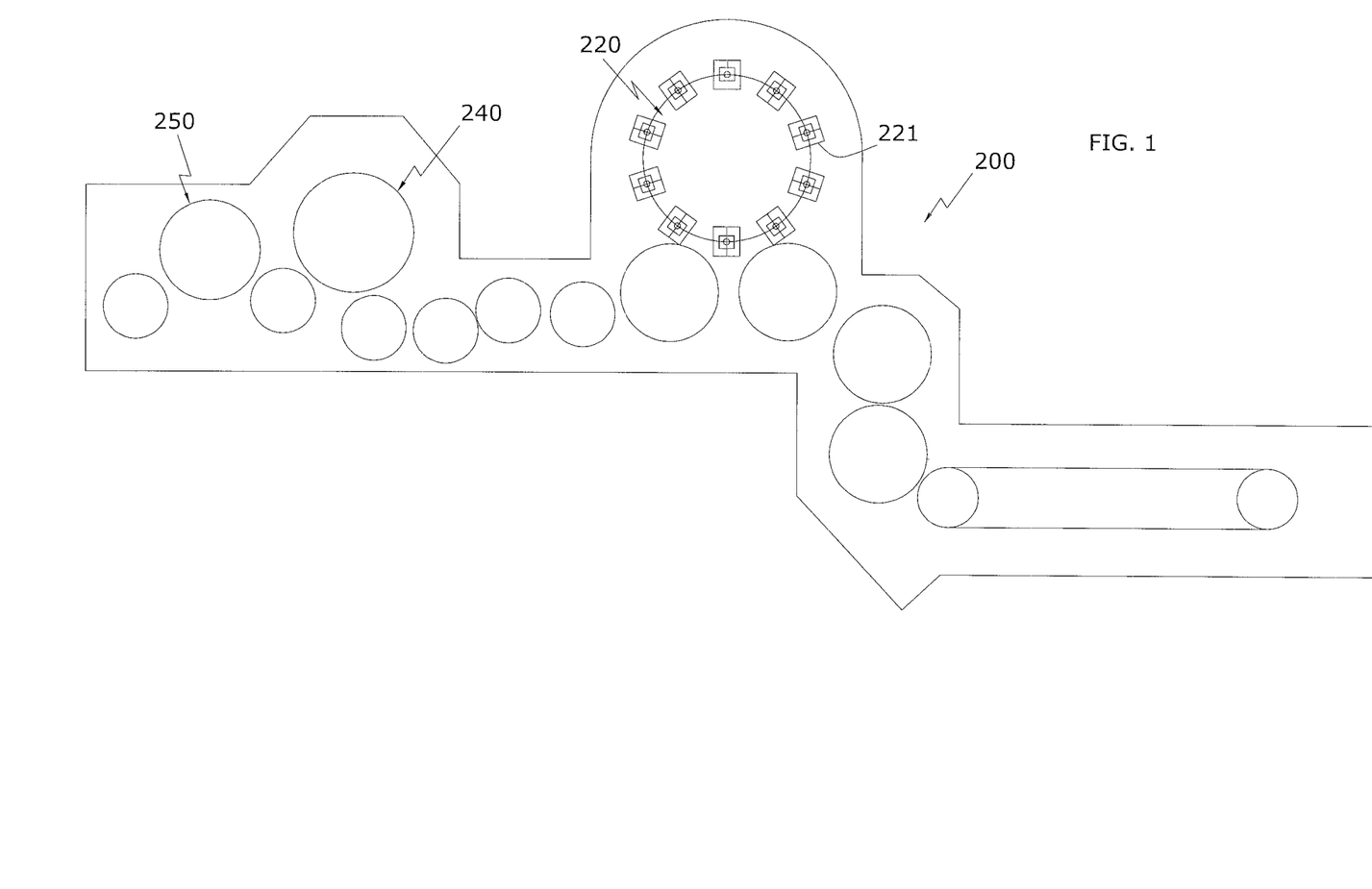
FIG. 1 illustrates a plan view of a bottling apparatus in aseptic conditions for containers made of thermoplastic material according to the present invention.

The bottling apparatus 200 comprises, for example:
a forming unit 220 for stretch-blowing having a plurality of forming stations 221 in each of which a forming mould 222, a bottom 223 and a blowing nozzle 224 can be found;
a filling unit 240 for filling the formed containers 100, having a plurality of filling stations in each of which a filling nozzle is arranged;
a closing unit 250 for closing the filled containers 100, having a plurality of closing or capping stations in each of which a closing or capping head is arranged.

The bottling apparatus 200 comprises at least one mobile organ partially situated in a contamination-controlled environment 3 and an actuation device 6 for actuating the mobile organ.

The mobile organ may be a stretching rod 5 as illustrated in FIGS. 2a to 6.

The mobile organ may be a blowing nozzle 224 of one of the forming stations 221.

The mobile organ may be a driving organ that drives the opening and closing of one of the forming moulds 222.

The mobile organ may be a driving organ that drives the rising and lowering of one of the bottoms 223, as illustrated in FIGS. 7a-7b or 8a-8b.

Figure 9A:
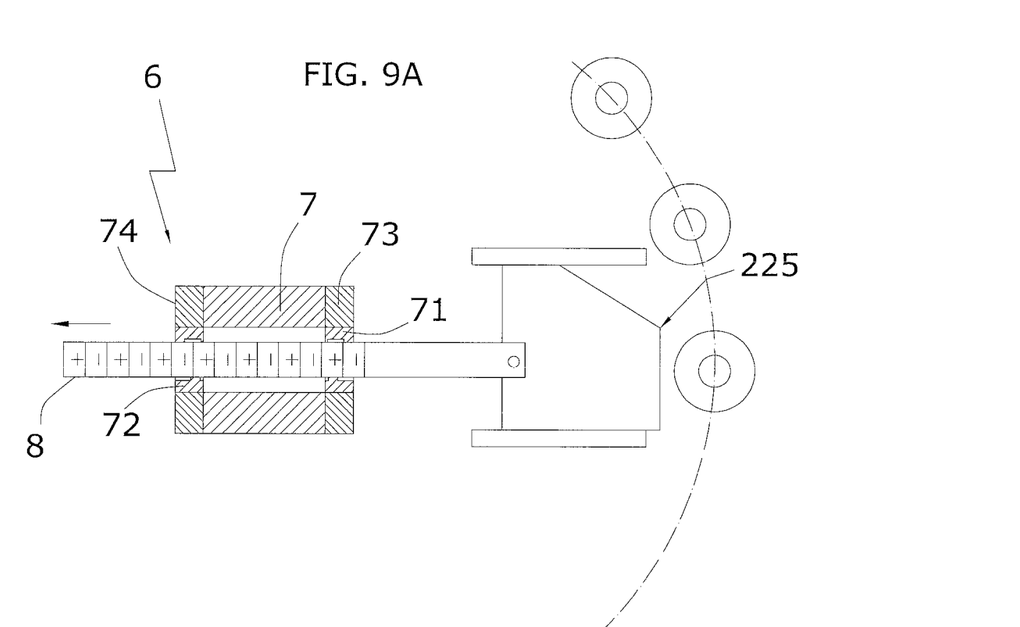
FIGS. 9a-9b illustrate two different steps of moving an ejector of the bottling apparatus of FIG. 1, in a sectional side view.
Figure 9B:
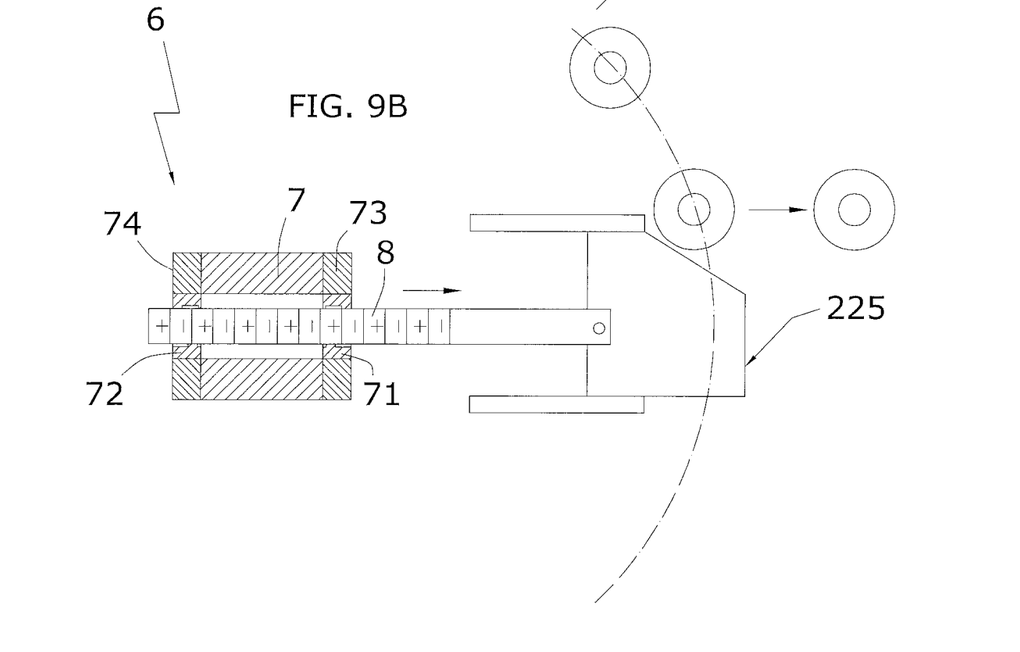

The mobile organ may be a pushing element or ejector 225 that expels the containers 100 to be discarded from the bottling apparatus 200, as illustrated in FIGS. 9a-9b.

The mobile organ may be a gripper that is operatively active on the neck 100a of one of the containers 100.

The contamination-controlled environment 3 is isolated, i.e. physically separated, with respect to an external (contaminated) environment 4 by an isolation device. Such isolation device is not the subject matter of the present invention, therefore it will not be further described or illustrated. By way of example, the isolation device described and illustrated in patent EP2246176 can be used.

In the figures, the separation between the contamination-controlled environment 3 and the external environment 4 is represented schematically by a line L.

The actuation device 6 comprises a linear motor, in turn comprising:
a cylindrical stator 7 (primary);
a rotor or magnetic shaft 8 (secondary) linearly sliding in the cylindrical stator 7.

As in all linear motors, the stator 7 houses the windings while the rotor 8 houses a plurality of permanent magnets.

The rotor 8 has a cylindrical development and the stator 7 has the shape of a hollow cylinder, coaxial to the rotor 8 and placed at a predetermined distance from the latter so that between the cylindrical stator 7 and the rotor 8 a separation volume 30 is defined (also known as a gap).

For example, the predetermined distance between the inner side surface of the stator 7 and the side surface of the rotor 8 is comprised between 0.5-3 mm.

The rotor 8 has a longer length with respect to the stator 7. Preferably, the rotor 8 has a length that is about twice that of the stator 7.

The rotor 8 is integrally connected to the mobile organ.

A first support 107 and a second support 207 for the rotor 8 are integrally connected to the two opposite ends of the stator 7 inside which the rotor 8 is slidably mounted.

Preferably, the first support 107 and the second support 207 substantially have the development of a hollow cylinder.

Advantageously, in each of such supports 107, 207 at least one passage is obtained to allow a sanitising fluid to flow through the separation volume 30.

Figure 4:
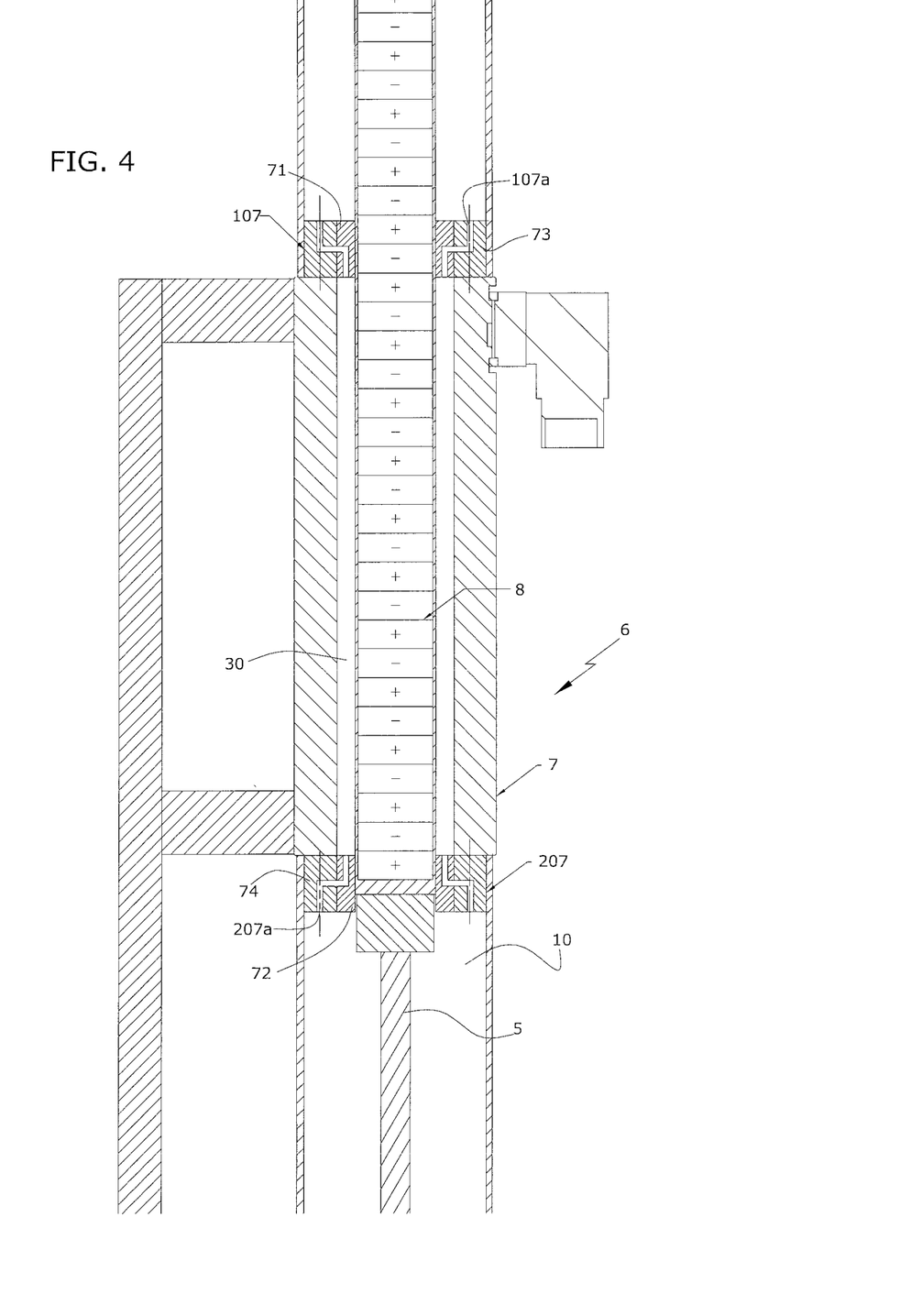
FIG. 4 illustrates a second embodiment of the linear motor of the stretch-blowing device, in a sectional side view.

In accordance with a first embodiment, illustrated for example in FIG. 4, the passage obtained in each of such supports 107, 207 is a through channel 107a, 207a which crosses the corresponding support 107, 207.

In particular, the first support 107 is crossed by at least one first through channel 107a and the second support 207 is crossed by at least one second through channel 207a.

Preferably, the first through channel 107a is cylindrical and coaxial to the first support 107. Also the second through channel 207a is cylindrical and coaxial to the second support 207.

Preferably, each of the two supports 107, 207 is obtained by the assembly or the combination of two coaxial cylindrical bodies.

In particular, the first support 107 is formed by a first inner hollow cylinder, also called "first bushing" 71 and a first outer hollow cylinder, indicated with the number 73.

In particular, the second support 207 is formed by a second inner hollow cylinder, also called "second bushing" 72 and a second outer hollow cylinder, indicated with the number 74.

The rotor 8 is therefore slidably mounted within the first bushing 71 and the second bushing 72.

Preferably, the first through channel 107a is obtained in the first bushing 71. It is a cylindrical channel and coaxial to the first bushing 71. The second through channel 207a is obtained in the second bushing 72. It is a cylindrical channel and coaxial to the second bushing 72 (see FIG. 3).

In accordance with a second embodiment, the first through channel 107a partially crosses the first bushing 71 and partially crosses the first outer hollow cylinder 73 and the second through channel 207a partially crosses the second bushing 72 and partially crosses the second outer hollow cylinder 74 (see FIG. 4).

Figure 3:
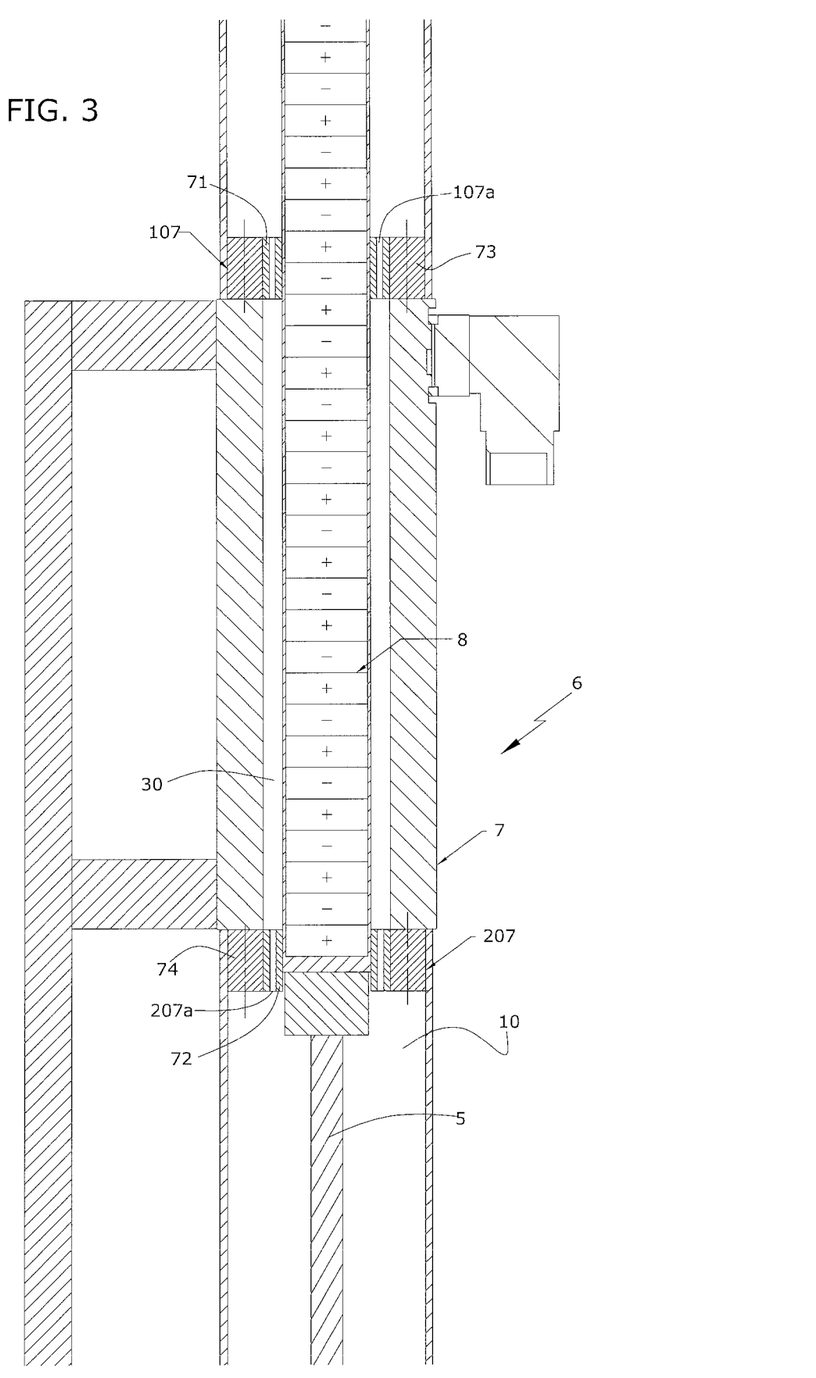
FIG. 3 illustrates a linear motor that can be used for moving the stretching rod of the stretch-blowing device of FIGS. 2a-2c, in a sectional side view, in accordance with a first embodiment.
Figure 5:
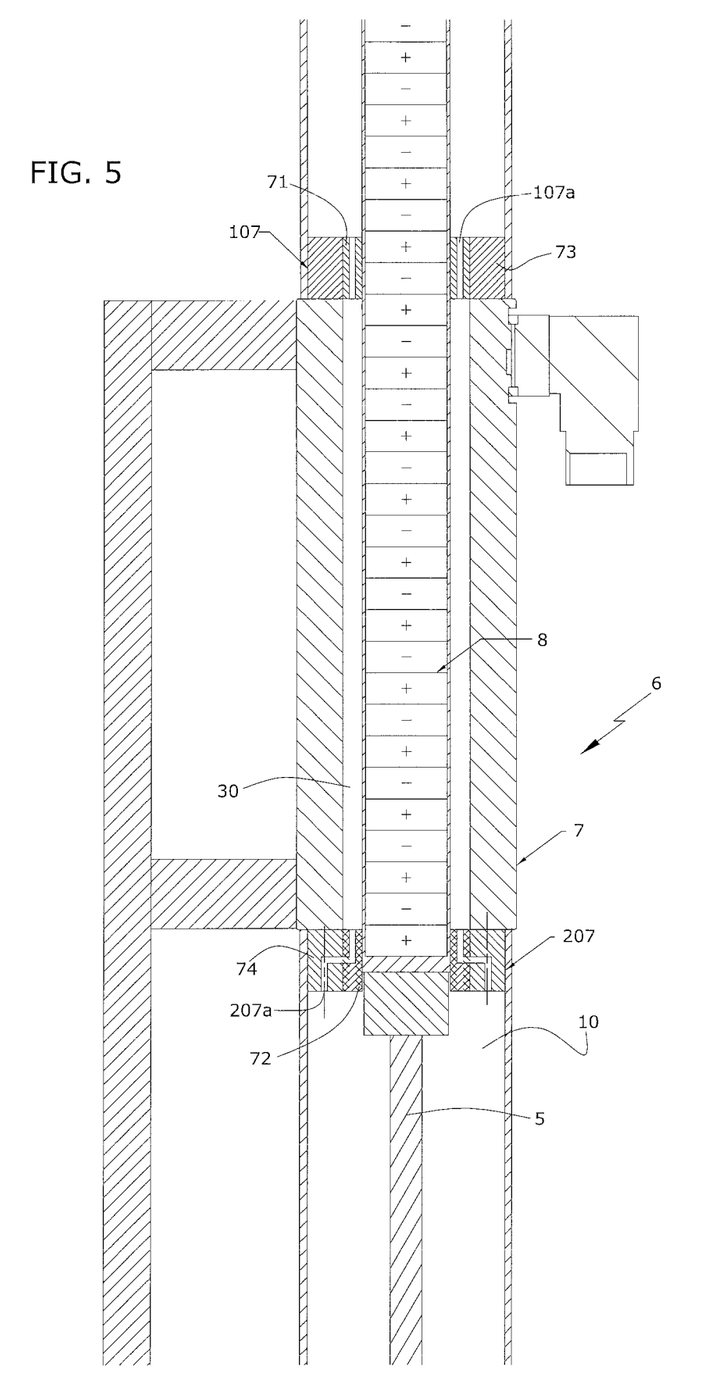
FIG. 5 illustrates a third embodiment of the linear motor of the stretch-blowing device, in a sectional side view.

A third embodiment is also envisaged, obtained by combining the two variants described above. In particular, as illustrated in FIG. 5:

the first support 107 is identical to that of the first embodiment of FIG. 3;

the second support 207 is identical to that of the second embodiment of FIG. 4.

A variant not illustrated envisages instead:

the first support 107 identical to that of the second embodiment of FIG. 4;

the second support 207 identical to that of the first embodiment of FIG. 3.

Figure 6:
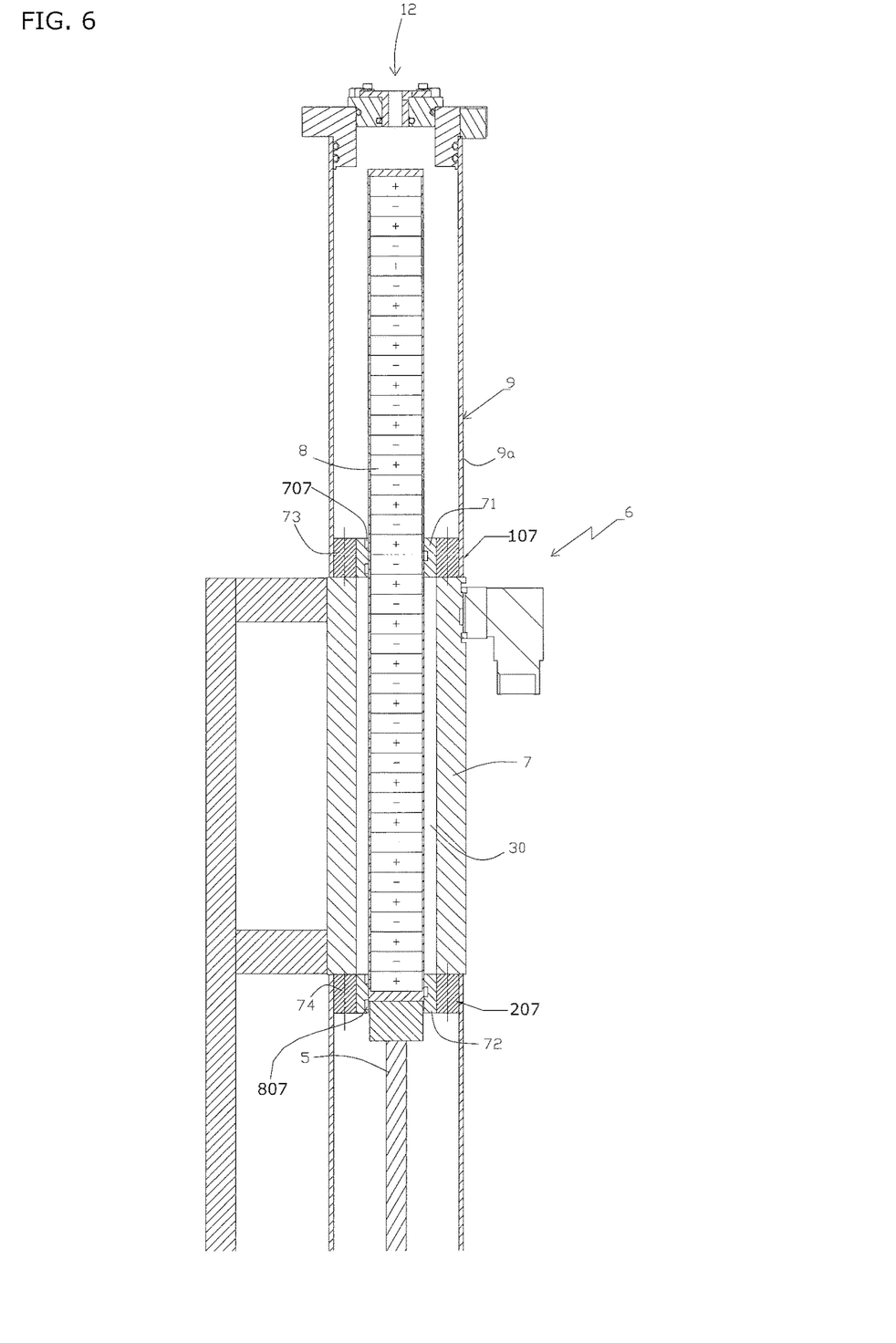
FIG. 6 illustrates a fourth embodiment of the linear motor of the stretch-blowing device, in a sectional side view.
Figure 7A:
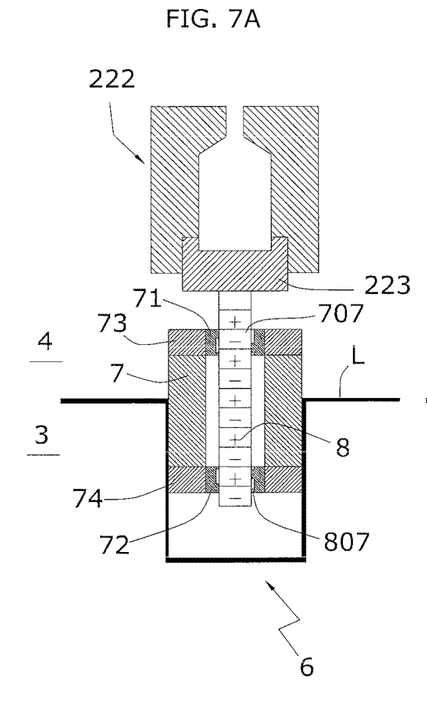
FIGS. 7a-7b illustrate two different steps of moving a bottom of a forming station of the bottling apparatus of FIG. 1, in a sectional side view.
Figure 7B:
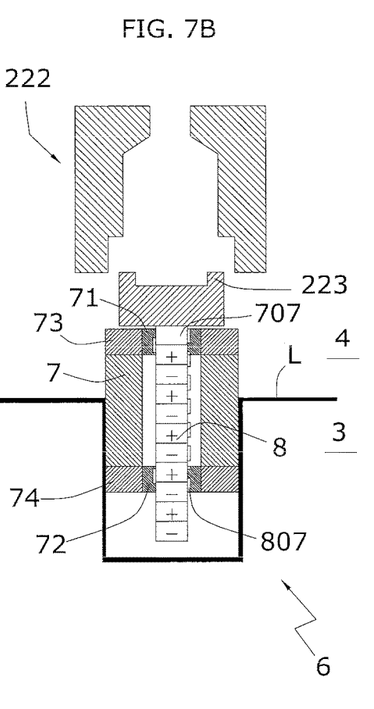
Figure 8A:
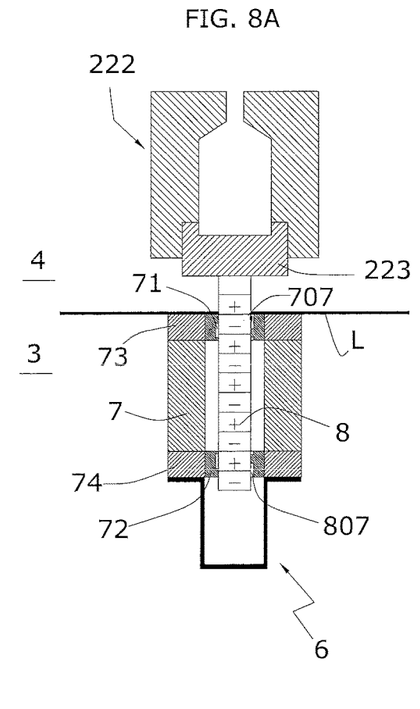
FIGS. 8a-8b illustrate a variant of the embodiment illustrated in FIGS. 7a-7b.
Figure 8B:
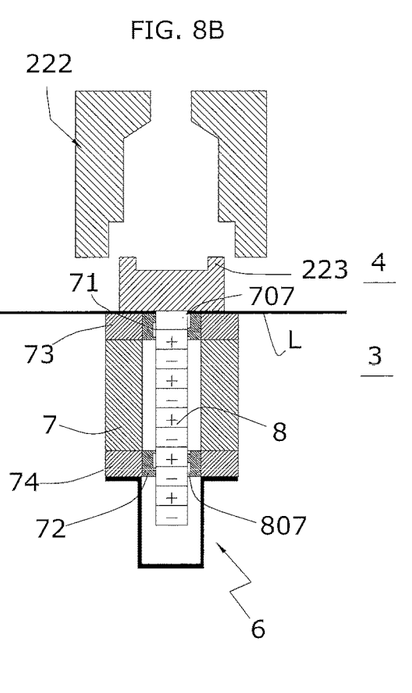

In accordance with a fourth embodiment, the passage obtained in each of such supports 107, 207 is a groove 707, 807 obtained on a surface (preferably on an inner side surface) of the corresponding support 107, 207.

Also here, the first support 107 is preferably formed by a first inner hollow cylinder or first bushing 71 and a first outer hollow cylinder 73. Likewise, the second support 207 is formed by a second inner hollow cylinder or second bushing 72 and a second outer hollow cylinder 74.

Preferably, a first grooved surface 707 is obtained on the inner side surface of the first bushing 71 while a second grooved surface 807 is obtained on the inner side surface of the second bushing 72.

By way of example, the following variants are noted:

each grooved surface has one or more grooves;

the grooves have a helicoidal development for both bushings 71, 72;

the grooves have a longitudinal development for both bushings 71, 72;

the grooves have a helicoidal development for the first bushing 71 and longitudinal for the second bushing 72;

the grooves have a longitudinal development for the first bushing 71 and helicoidal for the second bushing 72.

In accordance with a further embodiment (not shown), the passage obtained in the first support 107 consists in at least one groove obtained on a surface of the first support 107, while the passage obtained in the second support 207 consists in a through channel that crosses it.

In accordance with further embodiments (not illustrated), various passages (through channels and/or grooves) are obtained in each of the two supports 107, 207.

The case related to the stretching rod 5 as the mobile organ is disclosed in detail below.

Number 1 is used to indicate a stretch-blowing device in aseptic conditions for a parison 100, operating in one of the forming stations 221.

The device 1 comprises a blowing nozzle 224 applicable to the mouth 100a of the parison 100. In the sector, the blowing nozzle is also known as a "seal". The blowing nozzle 224 is at least partially in the contamination-controlled environment 3 in which the forming of the parison 100 takes place by stretch-blowing.

In the embodiments described and illustrated herein, the blowing nozzle 224 is entirely inside the contamination-controlled environment 3.

The device 1 comprises a means (not illustrated) to inject compressed air into the parison 100 through the blowing nozzle 224.

In particular, such means is configured to inject air at medium pressure (maximum 15 bar) and at high pressure (about 40 bar) into the parison 100.

The device 1 comprises the stretching rod 5 developing along a direction d and slidably mounted within the blowing nozzle 224 so that a first portion 5a thereof can penetrate inside the parison 100 through the mouth 100a.

The first portion 5a extends to an end of the stretching rod 5 and comprises such end.

Figure 2A:
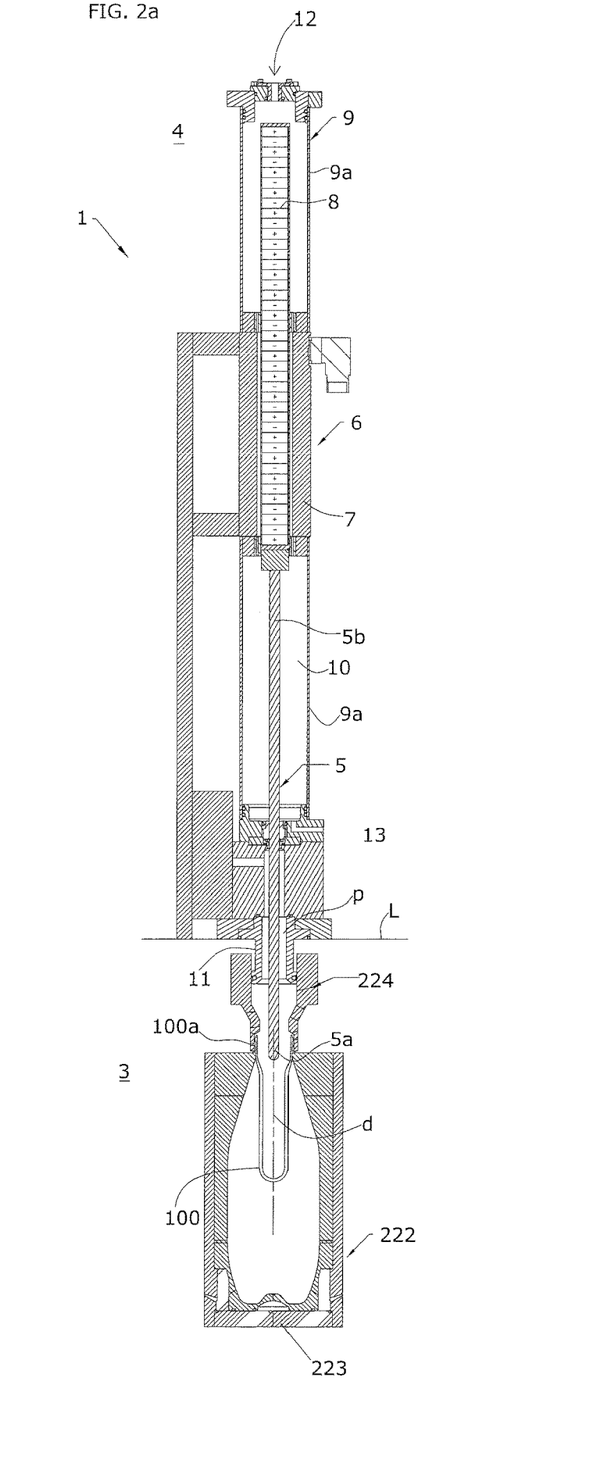
FIGS. 2a, 2b and 2c illustrate a stretch-blowing device in aseptic conditions, operating in one of the forming stations of the bottling apparatus of FIG. 1 in different operating steps, in a sectional side view.
Figure 2B:
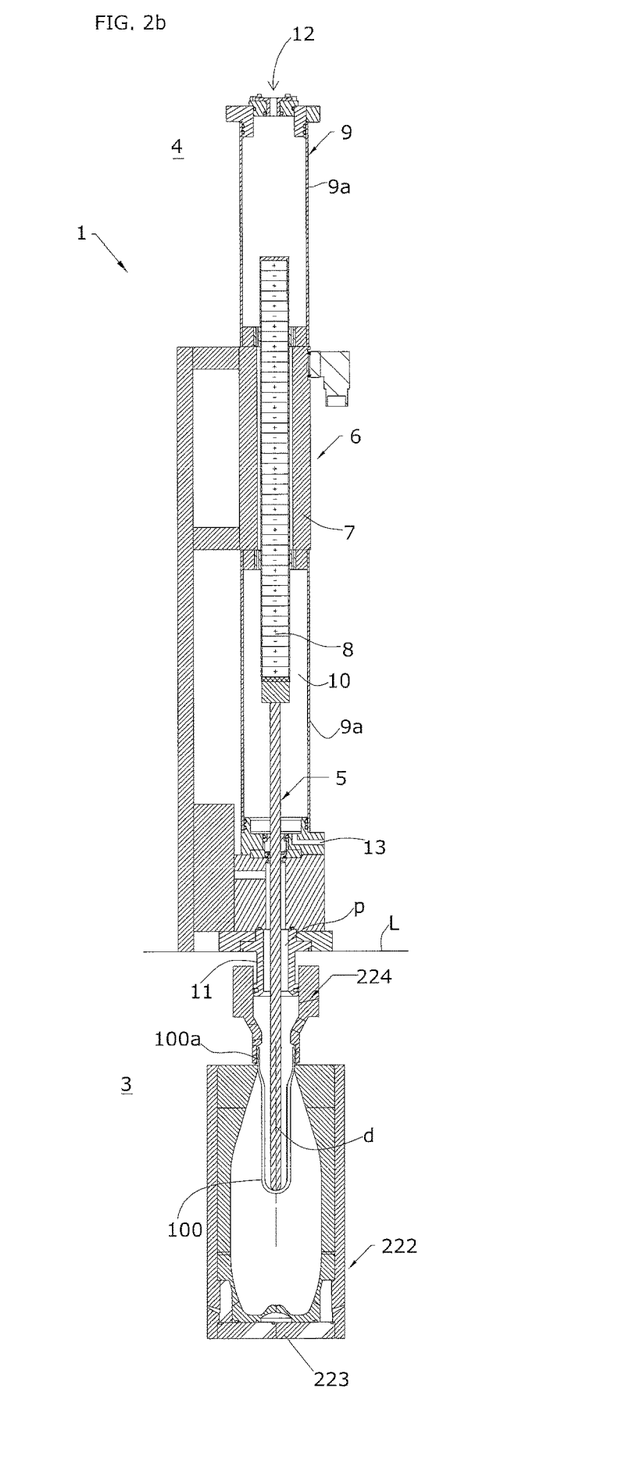
Figure 2C:
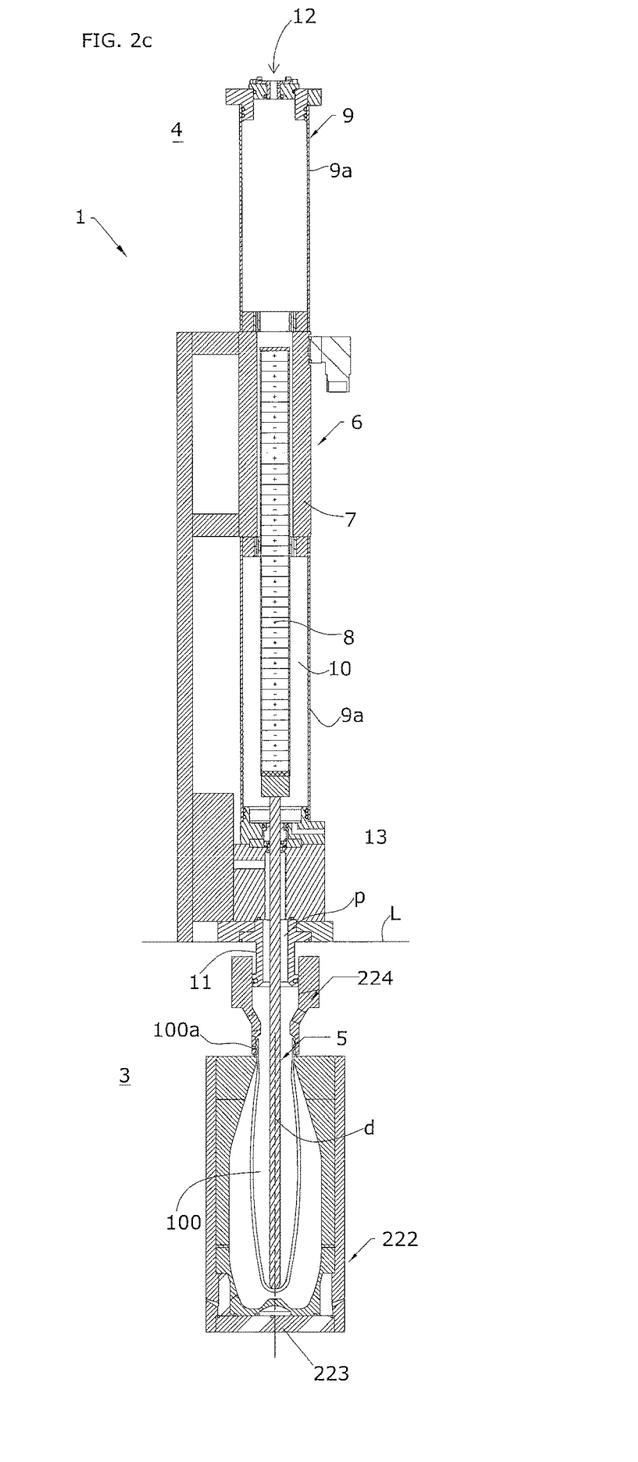

As illustrated in FIGS. 2a to 2c, the stretching rod 5 moves through an opening p afforded in the line L separating the contamination-controlled environment 3 and the external environment 4.

The movement of the stretching rod 5 relative to the blowing nozzle 224 (and therefore to the parison 100 below) is governed by the linear motor 6.

The rotor 8 is integrally connected to a second portion 5b of the stretching rod 5.

In particular, the second portion 5b of the stretching rod 5 extends to (and comprises) the end of the stretching rod 5 opposite the one that penetrates into the parison 100.

In the embodiments described and illustrated herein, the rotor 8 is fixed to such end of the stretching rod 5.

The device 1 comprises a box-shaped casing 9 that delimits a chamber 10 housing the second portion 5b of the stretching rod 5 and of the rotor 8.

The box-shaped casing 9 is formed by a plurality of walls 9a and by the stator 7 itself. In other words, the stator 7 represents a part of the box-shaped casing 9 delimiting such chamber 10.

Preferably, the walls 9a of the box-shaped casing 9 are made of non-magnetic material, for example stainless steel.

The box-shaped casing 9 is entirely situated in the external environment 4 and is configured so that the chamber 10 is sealingly closed with respect to the external environment 4.

In this way, the stretching rod 5 is prevented from coming into contact with the external environment 4, therefore with possible contaminants.

With respect to the contamination-controlled environment 3, the chamber 10 may be sealed or not.

Preferably, the box-shaped casing 9 is shaped like a tube having a longitudinal development along the same development direction d as the stretching rod 5.

Preferably, the device 1 comprises a sleeve 11 that surrounds the opening p and partially projects into the contamination-controlled environment 3 (where it is fixed to the blowing nozzle 224) and partially into the external environment 4 (where it is fixed directly or indirectly to the box-shaped casing 9).

The stretching rod 5 passes through such sleeve 11.

The box-shaped casing 9 has an inlet 12 to introduce the sanitising fluid within the chamber 10 and an outlet 13 to drain such fluid from the chamber 10.

Preferably, the inlet 12 and the outlet 13 for the sanitising fluid are at two opposite ends of the box-shaped casing 9, with the inlet 12 situated in the furthest end from the blowing nozzle 224 (hereinafter indicated as the "upper end" of the box-shaped casing 9) and the outlet 13 situated in the closest end to the blowing nozzle 224 (hereinafter indicated as the "lower end" of the box-shaped casing 9). In this way, the inlet 12 is at a greater height with respect to the outlet 13 and the sanitising fluid, once entered, crosses the chamber 10 (and the members contained therein) along its entire longitudinal extension, until being drained through the outlet 13.

The operation of the present invention is described below, with reference to the application to the stretching rod.

The operation of the stretch-blowing device in aseptic conditions for a parison made of thermoplastic material according to the present invention is described below.

The parison 100, previously heated, is inserted in a mould 222 situated in the contamination-controlled environment 3 and placed below the corresponding stretch-blowing device 1.

The blowing nozzle 224 is applied to the mouth 100a of the parison 100, as illustrated for example in FIG. 2a. The rotor 8 is in a minimum distance configuration with respect to the upper end of the box-shaped casing 9.

The air at medium pressure is insufflated into the parison 100 through the blowing nozzle 224, causing a progressive increase in the diameter of the parison 100.

Simultaneously, the electromagnetic field produced by the current that flows in the windings of the stator 7 causes the sliding of the rotor 8 away from the upper end of the box-shaped casing 9. Being integrally connected to the rotor 8, the stretching rod 5 is gradually inserted into the parison 100 along the entire length of the latter. Therefore, the parison 100 is stretched along the development direction d of the stretching rod 5.

From medium pressure there is a transition to the injection of high pressure air into the parison 100, which determines the swelling of the parison 100 such that the latter progressively tends to adhere to the inner walls of the mould 222.

Such steps are illustrated in FIGS. 2b-2c. In particular, FIG. 2c shows that the rotor 8 has reached a maximum distance configuration with respect to the upper end of the box-shaped casing 9, therefore the stretching rod 5 has reached proximity to the bottom 223.

The chamber 10 housing the stretching rod 5 and the rotor 8 can be sanitised by introducing the sanitising fluid through the inlet 12 of the box-shaped casing 9 during the normal operating cycle of the device 1.

The sanitisation can also be performed as a distinct step with respect to the normal operation of the device 1.

In that case, during sanitisation, the rotor 8 can possibly slow down or stop during its movement, before restarting its stroke. In this way, the sanitisation of contact surfaces is facilitated.

In the embodiments illustrated in FIGS. 3 to 5, the sanitising fluid flows over the rotor 8, crosses the first through channel 107a obtained in the first support 107, reaches the separation volume 30, crosses the second through channel 207a obtained in the second support 207 and reaches the stretching rod 5.

In the fourth embodiment, illustrated in FIG. 6, the sanitising fluid flows over the rotor 8 and, through the grooves 707, 807 obtained in the inner side surfaces of the bushings 71, 72, reaches the stretching rod 5.

The sanitising fluid is then drained through the outlet 13 of the box-shaped casing 9.

The characteristics and the advantages of the bottling apparatus in aseptic conditions of containers made of thermoplastic material, according to the present invention prove to be clearly indicated in the description provided.

In particular, the use of a linear motor for moving the mobile organ allows the direct driving of the load, preventing having to provide motion transformation members, with consequent disadvantages in terms of precision.

The creation of grooves or through channels in the rotor supports allows the passage of sanitising fluid and the cleaning of the surfaces of the motor which are subject to rubbing.

The invention claimed is:

1. Bottling apparatus (200) in aseptic conditions for containers (100) made of thermoplastic material, comprising:
at least one mobile organ (5; 223; 225) partially located in a contamination-controlled environment (3) that is isolated from an external environment (4);
an actuation device (6) for actuating said at least one mobile organ (5; 223; 225), characterised in that said actuation device (6) comprises a linear motor in turn comprising:
a cylindrical stator (7);
a rotor or magnetic shaft (8) linearly sliding in said cylindrical stator (7) and spaced thereto in such a way that between the cylindrical stator (7) and the rotor (8) a separation volume (30) is obtained, said rotor (8) being integrally connected to the mobile organ (5; 223; 225);
a first support (107) and a second support (207) for said rotor (8) in which said rotor (8) is slidably mounted, said first support (107) and said second support (207) being located at opposite ends of the cylindrical stator (7) and integrally connected thereto, in each of said supports (107, 207) being obtained at least one passage (707, 807; 107a, 207a) to allow a sanitizing fluid to flow through said separation volume (30).

2. Bottling apparatus (200) according to claim 1, wherein the passage obtained in each support (107, 207) consists in at least one groove (707, 807) obtained on a surface of the corresponding support (107, 207).

3. Bottling apparatus (200) according to claim 2, wherein said first support (107) and said second support (207) have the shape of a hollow cylinder.

4. Bottling apparatus (200) according to claim 3, wherein the groove (707, 807) of each support (107, 207) is obtained on an inner side surface of the corresponding support (107, 207).

5. Bottling apparatus (200) according to claim 2, wherein the groove (707, 807) of each support (107, 207) has a helicoidal or longitudinal development.

6. Bottling apparatus (200) according to claim 1, wherein the passage obtained in each support (107, 207) is a through channel (107a, 207a) that crosses the corresponding support (107, 207).

7. Bottling apparatus (200) according to claim 6, wherein said first support (107) and said second support (207) have the shape of a hollow cylinder.

8. Bottling apparatus (200) according to claim 6, wherein each of said supports (107, 207) is obtained by the assembly or the combination of an inner hollow cylinder (71, 72) and an outer hollow cylinder (73, 74) which is coaxial to the corresponding inner hollow cylinder (71, 72), said rotor (8) being slidably mounted within said inner hollow cylinders (71, 72).

9. Bottling apparatus (200) according to claim 8, wherein the through channel (107a, 207a) of each support (107, 207) is obtained in the corresponding inner hollow cylinder (71, 72).

10. Bottling apparatus (200) according to claim 9, wherein the through channel (107a, 207a) of each support (107, 207) has a cylindrical development and is coaxial to the corresponding inner hollow cylinder (71, 72).

11. Bottling apparatus (200) according to claim 8, wherein the through channel (107a, 207a) of each support (107, 207) partially crosses the corresponding inner hollow cylinder (71, 72) and partially crosses the corresponding outer hollow cylinder (73, 74).

12. Bottling apparatus (200) according to claim 8, wherein the through channel (107a) obtained in the first support (107) crosses only the corresponding inner hollow cylinder (71) and the through channel (207a) obtained in the second support (207) partially crosses the corresponding inner hollow cylinder (72) and partially crosses the corresponding outer hollow cylinder (74).

13. Bottling apparatus (200) according to claim 8, wherein the through channel (107a) obtained in the first support (107) partially crosses the corresponding inner hollow cylinder (71) and partially crosses the corresponding outer hollow cylinder (73) and the through channel (207a) obtained in the second support (207) crosses only the corresponding inner hollow cylinder (72).

14. Bottling apparatus (200) according to claim 1, wherein the passage obtained in the first support (107) consists in at least one groove (707) obtained on a surface of said first support (107) and the passage obtained in the second support (207) is a through channel (207a) that crosses said second support (207).

15. Bottling apparatus (200) according to claim 1, wherein in each of said supports (107, 207) is obtained a plurality of passages.

16. Bottling apparatus (200) according to claim 1, wherein said mobile organ is a stretching rod (5).

17. Bottling apparatus (200) according to claim 1, wherein said mobile organ is a blowing nozzle (224).

18. Bottling apparatus (200) according to claim 1, wherein said mobile organ is a driving organ that drives the opening and closing of a forming mould (222) of the bottling apparatus (200).

19. Bottling apparatus (200) according to claim 1, wherein said mobile organ is a driving organ that drives the rising and lowering of a bottom (223) of the bottling apparatus (200).

20. Bottling apparatus (200) according to claim 1, wherein said mobile organ is a pushing element (225) that expels the containers (100) to be discarded.

21. Bottling apparatus (200) according to claim 1, wherein said mobile organ is a gripper that is operatively active on the neck (100a) of one of the containers (100).

* * * * *